(12) United States Patent
Turtinen et al.

(10) Patent No.: US 12,015,981 B2
(45) Date of Patent: Jun. 18, 2024

(54) WAKE-UP SIGNAL MONITORING INDICATION

(71) Applicant: Nokia Technologies Oy, Espoo (FI)

(72) Inventors: Samuli Turtinen, Ii (FI); Chunli Wu, Beijing (CN); Jussi-Pekka Koskinen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/847,848

(22) Filed: Apr. 14, 2020

(65) Prior Publication Data

US 2020/0359325 A1  Nov. 12, 2020

(30) Foreign Application Priority Data

May 10, 2019  (WO) ................ PCT/CN2019/086368

(51) Int. Cl.
*H04W 52/02* (2009.01)
*H04W 72/23* (2023.01)

(52) U.S. Cl.
CPC ....... *H04W 52/0235* (2013.01); *H04W 72/23* (2023.01)

(58) Field of Classification Search
None
See application file for complete search history.

(56) References Cited

U.S. PATENT DOCUMENTS

| 2011/0069650 A1 | 3/2011 | Singh et al. |
| 2018/0332533 A1 | 11/2018 | Bhattad et al. |
| 2020/0029302 A1* | 1/2020 | Cox ................. H04W 56/0015 |
| 2020/0100179 A1* | 3/2020 | Zhou ..................... G06F 1/3209 |

(Continued)

FOREIGN PATENT DOCUMENTS

| CN | 108024319 A | 5/2018 |
| JP | 2021/502772 A | 1/2021 |

(Continued)

OTHER PUBLICATIONS

"New SID: Study on UE Power Saving in NR", 3GPP TSG RAN Meetings #80, RP-181463, Agenda : 9.1.8, CATT, Jun. 11-14, 2018, 5 pages.

(Continued)

*Primary Examiner* — Clemence S Han
(74) *Attorney, Agent, or Firm* — ALSTON & BIRD LLP

(57) ABSTRACT

In one exemplary embodiment, a method includes: determining, by a network node, information of at least one period of time that a user equipment is to monitor for a wake-up signal to decode, where the information comprises indications of a configuration or a behavior for the user equipment to dynamically control the monitoring of the wake-up signal for the decoding; and communicating signaling comprising the information towards the user equipment. In another exemplary embodiment, a method includes: receiving from a network node, by a user equipment, information of at least one period of time that the user equipment is to monitor for a wake-up signal to decode, where the information comprises indications of a configuration or a behavior for the user equipment to dynamically control the monitoring of the wake-up signal for the decoding; and using the information to perform the monitoring of the wake-up signal for the decoding.

26 Claims, 4 Drawing Sheets

---

510: determining, by a network node, information of at least one period of time that the user equipment is to monitor for a wake-up signal to decode, where the information comprises indications of at least one of a configuration or a behavior for the user equipment to dynamically control the monitoring of the wake-up signal for the decoding 520: communicating signaling comprising the information towards the user equipment

(56) References Cited

U.S. PATENT DOCUMENTS

| | | | |
|---|---|---|---|
| 2020/0150736 A1* | 5/2020 | Nam | G06F 1/325 |
| 2020/0205079 A1* | 6/2020 | Tong | H04W 68/02 |
| 2020/0314749 A1* | 10/2020 | Sarkis | H04W 52/0219 |
| 2020/0351777 A1* | 11/2020 | Kim | H04L 5/0053 |
| 2020/0367168 A1* | 11/2020 | Hwang | H04W 48/12 |
| 2021/0168719 A1* | 6/2021 | Sugiyama | H04W 76/28 |
| 2021/0168781 A1* | 6/2021 | Lee | H04W 72/042 |
| 2021/0227463 A1 | 7/2021 | Futaki | |
| 2021/0227466 A1* | 7/2021 | Kim | H04W 68/005 |
| 2021/0243694 A1* | 8/2021 | Li | H04W 76/28 |
| 2021/0243763 A1* | 8/2021 | Zhou | H04L 1/1819 |
| 2021/0259044 A1* | 8/2021 | Islam | H04W 52/0229 |
| 2022/0078879 A1* | 3/2022 | Nimbalker | H04W 76/28 |
| 2022/0132542 A1* | 4/2022 | Matsumura | H04W 72/1273 |

FOREIGN PATENT DOCUMENTS

| | | |
|---|---|---|
| RU | 2498534 C1 | 11/2013 |
| WO | WO 2011/040516 A1 | 4/2011 |
| WO | WO 2018/203822 A1 | 11/2018 |
| WO | WO 2018/208956 A1 | 11/2018 |
| WO | 2019/030337 A1 | 2/2019 |
| WO | 2019/078969 A1 | 4/2019 |

OTHER PUBLICATIONS

"Summary of PDCCH-based Power Saving Signal/Channel", 3GPP TSG RAN WG1 #96bis, R1-1905676, Agenda : 7.2.9.1, CATT, Apr. 8-12, 2019, pp. 1-5.

International Search Report and Written Opinion received for corresponding Patent Cooperation Treaty Application No. PCT/CN2019/086368, dated Feb. 14, 2020, 9 pages.

"Wake up signalling for efeMTC", 3GPP TSG RAN WG1 Meeting #90, R1-1714576, Agenda : 5.2.6.2, Sony, Aug. 21-25, 2017, 12 pages.

Office Action for Algerian Application No. DZ/P/2021/000757 dated Jun. 29, 2022, 2 pages.

Office Action for Russian Application No. 2021135310/07 dated Jul 12, 2022, 13 pages.

Examination Report for Indian Application No. 20217054947 dated Aug. 23, 2022, 6 pages.

"3rd Generation Partnership Project; Technical Specification Group Radio Access Network; NR; Medium Access Control (MAC) protocol specification (Release 16)", 3GPP TS 38.321 v16.2.0, (Sep. 2020), 154 pages.

"3rd Generation Partnership Project; Technical Specification Group Radio Access Network; NR; Multiplexing and channel coding (Release 16)", 3GPP TS 38.212 v16.3.0, (Sep. 2020), 152 pages.

"3rd Generation Partnership Project; Technical Specification Group Radio Access Network; NR; Physical layer procedures for control (Release 16)", 3GPP TS 38.213 v16.3.0, (Sep. 2020), 179 pages.

"3rd Generation Partnership Project; Technical Specification Group Radio Access Network; NR; Radio Resource Control (RRC) protocol specification (Release 16)", 3GPP TS 38.311 v16.2.0, (Sep. 2020), 926 pages.

"3rd Generation Partnership Project; Technical Specification Group Radio Access Network; NR; Study on User Equipment (UE) power saving in NR (Release 16)", 3GPP TR 38.840 v16.0.0, (Jun. 2019), 74 pages.

Catt, "RAN2 Impacts of PDCCH Based WUS", 3GPP TSG-RAN WG2 Meeting #106, R2-1905666, (May 13-17, 2019), 5 pages.

Decision to Grant for Russian Application No. 2021135310/07 dated Oct. 11, 2022, 24 pages.

Extended European Search Report for European Application No. 19928704.6 dated Nov. 17, 2022, 8 pages.

Li et al., "Power Saving Techniques for 5G and Beyond", IEEE Access, vol. 8, (Jun. 9, 2020), 15 pages.

Notice of Acceptance for Nigerian Application No. F/P/2022/293 dated Aug. 4, 2022, 1 page.

Office Action for Australian Application No. 2019445801 dated Sep. 23, 2022, 3 pages.

Office Action for Japanese Application No. 2021-566514 dated Dec. 19, 2022, 10 pages.

Samsung, "PDCCH-Based Power Saving Signal/Channel", 3GPP TSG RAN WG1 #97, R1-1906980, (May 13-17, 2019), 12 pages.

Xiaomi Communications, "Discussion on How the WUS Works with C-DRX", 3 GPP TSG-RAN2 #106, R2-1906484, (May 13-17, 2019), 4 pages.

Office Action for Chinese Application No. 201980097854.7 dated Jun. 1, 2023, 14 pages.

Office Action for Russian Application No. 2022132310/07 dated Aug. 10, 2023, 12 pages.

Decision to Grant for Japanese Application No. 2021-566514 dated Sep. 11, 2023, 5 pages.

Office Action for Chinese Application No. 201980097854.7 dated Apr. 10, 2024, 6 pages.

* cited by examiner

WAKE-UP SIGNAL MONITORING INDICATION

TECHNICAL FIELD

The teachings in accordance with the exemplary embodiments of this invention relate generally to novel and improved wake-up signal (WUS) control and configuration operations, and more specifically relate to implementing these novel and improved operations to enable user equipment to dynamically adapt its monitoring and usage of wake-up signal (WUS) control and configuration operations.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
C-DRX connected mode DRX
DRX discontinuous reception
MAC medium access control
MAC CE MAC control element).
MTC machine-type communication
MWUS MTC Wake Up Signal
NW network
NWUS Narrow Band Wake Up Signal
PDCCH physical downlink control channel
WUS wake-up signal In accordance with standards at the time of this application a communication network may include a plurality of communication nodes (e.g., electronic devices), where a communication node may transmit a wake-up signal to another communication node when a specific event is detected or may occur. Upon receiving the wake-up signal, an operation mode of a communication node may transition from a sleep mode to a normal mode. Thereafter, the communication node can perform operations associated with a wake-up signal if the communication node is aware of the wake-up reason.

However, it is noted that in standards at the time of this application the communication node may not be sufficiently aware of a time to monitor or awaken for the wake-up signal, such that operations associated with the wake-up signal may not be performed in a most efficient manner. For example, in case that information indicating a wake-up is transmitted, without instructions of a separate message regarding monitoring the communication node may not know a best way to monitor for the wake-up signal using current operations. Thus, the monitoring here for such a wake-up signal may reduce a power saving ability of the communication node.

Example embodiments of the invention work to address as least these issues as stated above.

SUMMARY

In an example aspect of the invention, there is an apparatus, such as a network side apparatus, comprising: at least one processor; and at least one memory including computer program code, where the at least one memory and the computer program code are configured, with the at least one processor, to cause the apparatus to at least: determine, by a network node, information of at least one period of time that the user equipment is to monitor for a wake-up signal to decode, where the information comprises indications of at least one of a configuration or a behavior for the user equipment to dynamically control the monitoring of the wake-up signal for the decoding; and communicate signaling comprising the information towards the user equipment.

Further example embodiments include an apparatus comprising the apparatus of the previous paragraph, wherein the indications are of a configuration to dynamically control monitoring of the wake-up signal for the decoding are indicating whether or not to monitor the wake-up signal for the at least one period of time before an on-duration start assigned to the user equipment. In accordance with an example aspect of an example embodiment of the invention as performed by the apparatus of the previous paragraph, wherein the on-duration start is for a next on-duration assigned to the user equipment, wherein the indications are of a configuration to dynamically control monitoring of the wake-up signal for the decoding are using a medium access control element associated with the signaling, wherein the indications are of a configuration to dynamically control decoding of the wake-up signal are using downlink control information associated with the signaling, wherein the indications are of a configuration to dynamically control the monitoring of the wake-up signal for the decoding comprise an indication of a number of discontinuous reception cycles of the user equipment to one of monitor for the wake-up signal or not monitor for the wake-up signal, wherein the indications are of a configuration identifying to the user equipment to monitor the wake-up signal for the at least one period of time before the next on-duration start, wherein the indications are for a behavior of the user equipment to monitor for the wake-up signal only during one of a short discontinuous reception cycle or a long discontinuous reception cycle, wherein the indications for the behavior of the user equipment are indicating to monitor the wake-up signal for the at least one period of time only when the long discontinuous reception cycle is being used, wherein the indications to dynamically control the monitoring of the wake-up signal for the decoding are indicating that when the short discontinuous reception cycle is being used to monitor the next on-duration start for the wake-up signal without monitoring for the wake-up signal in advance of the next on-duration start, wherein the indications to dynamically control the monitoring of the wake-up signal for the decoding comprise an indication to monitor a further discontinuous reception cycle enabled after one of the long discontinuous reception or the short discontinuous reception has been monitored for a period of time, wherein the indications to dynamically control the monitoring of the wake-up signal for the decoding comprise an indication to monitor for the wake-up signal for the at least one period of time before a start of the next on duration if there was no communication of uplink data or downlink data was performed during a previous active time for the user equipment, wherein for a case there was no uplink data or downlink data performed during the previous active time, the indications to dynamically control the monitoring of the wake-up signal for the decoding comprise an indication to monitor the on-duration without monitoring the wake-up signal in advance, wherein for a case there was uplink data or downlink data performed during the previous active time, the indications to dynamically control the monitoring of the wake-up signal for the decoding comprise an indication to monitor for the wake-up signal in advance, and wherein the indication to monitor for the wake-up signal in advance is based on an acknowledgement being received by the user equipment in response to uplink data being performed during the previous active time for the user equipment.

In another example aspect of the invention, there is a method comprising: determining, by a network node, information of at least one period of time that a user equipment is to monitor for a wake-up signal to decode, where the information comprises indications of at least one of a configuration or a behavior for the user equipment to dynamically control the monitoring of the wake-up signal for the decoding; and communicating signaling comprising the information towards the user equipment.

A further example embodiment is a method comprising the method of the previous paragraph, wherein the indications are of a configuration to dynamically control monitoring of the wake-up signal for the decoding are indicating whether or not to monitor the wake-up signal for the at least one period of time before an on-duration start assigned to the user equipment, wherein the on-duration start is for a next on-duration assigned to the user equipment, wherein the indications are of a configuration to dynamically control monitoring of the wake-up signal for the decoding are using a medium access control element associated with the signaling, wherein the indications are of a configuration to dynamically control decoding of the wake-up signal are using downlink control information associated with the signaling, wherein the indications are of a configuration to dynamically control the monitoring of the wake-up signal for the decoding comprise an indication of a number of discontinuous reception cycles of the user equipment to one of monitor for the wake-up signal or not monitor for the wake-up signal, wherein the indications are of a configuration identifying to the user equipment to monitor the wake-up signal for the at least one period of time before the next on-duration start, wherein the indications are for a behavior of the user equipment to monitor for the wake-up signal only during one of a short discontinuous reception cycle or a long discontinuous reception cycle, wherein the indications for the behavior of the user equipment are indicating to monitor the wake-up signal for the at least one period of time only when the long discontinuous reception cycle is being used, wherein the indications to dynamically control the monitoring of the wake-up signal for the decoding are indicating that when the short discontinuous reception cycle is being used to monitor the next on-duration start for the wake-up signal without monitoring for the wake-up signal in advance of the next on-duration start, wherein the indications to dynamically control the monitoring of the wake-up signal for the decoding comprise an indication to monitor a further discontinuous reception cycle enabled after one of the long discontinuous reception or the short discontinuous reception has been monitored for a period of time, wherein the indications to dynamically control the monitoring of the wake-up signal for the decoding comprise an indication to monitor for the wake-up signal for the at least one period of time before a start of the next on duration if there was no communication of uplink data or downlink data was performed during a previous active time for the user equipment, wherein for a case there was no uplink data or downlink data performed during the previous active time, the indications to dynamically control the monitoring of the wake-up signal for the decoding comprise an indication to monitor the on-duration without monitoring the wake-up signal in advance, wherein for a case there was uplink data or downlink data performed during the previous active time, the indications to dynamically control the monitoring of the wake-up signal for the decoding comprise an indication to monitor for the wake-up signal in advance, and wherein the indication to monitor for the wake-up signal in advance is based on an acknowledgement being received by the user equipment in response to uplink data being performed during the previous active time for the user equipment.

In an example aspect of the invention, there is an apparatus, such as a network side apparatus, comprising: means for determining, by a network node, information of at least one period of time that a user equipment is to monitor for a wake-up signal to decode, where the information comprises indications of at least one of a configuration or a behavior for the user equipment to dynamically control the monitoring of the wake-up signal for the decoding; and means for communicating signaling comprising the information towards the user equipment.

A further example embodiment is an apparatus comprising the apparatus of the previous paragraph, wherein the indications are of a configuration to dynamically control monitoring of the wake-up signal for the decoding are indicating whether or not to monitor the wake-up signal for the at least one period of time before an on-duration start assigned to the user equipment. In accordance with an example aspect of an example embodiment of the invention as performed by the apparatus of the previous paragraph, wherein the on-duration start is for a next on-duration assigned to the user equipment, wherein the indications are of a configuration to dynamically control monitoring of the wake-up signal for the decoding are using a medium access control element associated with the signaling, wherein the indications are of a configuration to dynamically control decoding of the wake-up signal are using downlink control information associated with the signaling, wherein the indications are of a configuration to dynamically control the monitoring of the wake-up signal for the decoding comprise an indication of a number of discontinuous reception cycles of the user equipment to one of monitor for the wake-up signal or not monitor for the wake-up signal, wherein the indications are of a configuration identifying to the user equipment to monitor the wake-up signal for the at least one period of time before the next on-duration start, wherein the indications are for a behavior of the user equipment to monitor for the wake-up signal only during one of a short discontinuous reception cycle or a long discontinuous reception cycle, wherein the indications for the behavior of the user equipment are indicating to monitor the wake-up signal for the at least one period of time only when the long discontinuous reception cycle is being used, wherein the indications to dynamically control the monitoring of the wake-up signal for the decoding are indicating that when the short discontinuous reception cycle is being used to monitor the next on-duration start for the wake-up signal without monitoring for the wake-up signal in advance of the next on-duration start, wherein the indications to dynamically control the monitoring of the wake-up signal for the decoding comprise an indication to monitor a further discontinuous reception cycle enabled after one of the long discontinuous reception or the short discontinuous reception has been monitored for a period of time, wherein the indications to dynamically control the monitoring of the wake-up signal for the decoding comprise an indication to monitor for the wake-up signal for the at least one period of time before a start of the next on duration if there was no communication of uplink data or downlink data was performed during a previous active time for the user equipment, wherein for a case there was no uplink data or downlink data performed during the previous active time, the indications to dynamically control the monitoring of the wake-up signal for the decoding comprise an indication to monitor the on-duration without monitoring the wake-up signal in advance, wherein for a case there was uplink data or downlink data performed during the previous active time, the indications to dynamically control the monitoring of the wake-up signal for the decoding comprise an indication to monitor for the wake-up signal in advance, and wherein the indication to monitor for the wake-up signal in advance is based on an acknowledgement being received by the user equipment in response to uplink data being performed during the previous active time for the user equipment.

In accordance with the example embodiments as described in the paragraph above, at least the means for determining and communicating comprises a network interface, and computer program code stored on a computer-readable medium and executed by at least one processor.

In the example aspect of the invention according to the paragraph above, wherein at least the means for determining and communicating comprises a transceiver [TRANS 10D, TRANS 12D, TRANS 13D, and/or TRANS 14D as in FIG. 4] a non-transitory computer readable medium [MEM 10A, MEM 12B, MEM 13B, and/or MEM 14B as in FIG. 4] encoded with a computer program [PROG 10C, PROG 12C, PROG 13C, and/or PROG 14C as in FIG. 4] executable by at least one processor [DP 10A, DP 12A, DP 13A, and/or DP 14A as in FIG. 4].

In an example aspect of the invention, there is an apparatus, such as a user side apparatus, comprising: at least one processor; and at least one memory including computer program code, where the at least one memory and the computer program code are configured, with the at least one processor, to cause the apparatus to at least: receive from a network node, by a user equipment, information of at least one period of time that the user equipment is to monitor for a wake-up signal to decode, where the information comprises indications of at least one of a configuration or a behavior for the user equipment to dynamically control the monitoring of the wake-up signal for the decoding. Then use the information to perform the monitoring of the wake-up signal for the decoding.

Further example embodiments include an apparatus comprising the apparatus of the previous paragraph, wherein the indications are of a configuration to dynamically control the monitoring of the wake-up signal for the decoding are indicating whether or not to monitor the wake-up signal for the at least one period of time before an on-duration start assigned to the user equipment, wherein the on-duration start is for a next on-duration assigned to the user equipment, wherein the indications are of a configuration to dynamically control the monitoring of the wake-up signal for the decoding are using a medium access control element associated with the signaling, wherein the indications to dynamically control the monitoring of the wake-up signal for the decoding are using downlink control information associated with the signaling, wherein the indications are of a configuration to dynamically control the monitoring of the wake-up signal for the decoding comprise an indication of a number of discontinuous reception cycles of the user equipment to one of monitor for the wake-up signal or not monitor for the wake-up signal, wherein the indications are of a configuration identifying to the user equipment to monitor the wake-up signal for the at least one period of time before the next on-duration start, wherein indications are for a behavior of the user equipment to monitor for the wake-up signal only during one of short discontinuous reception cycle or a long discontinuous reception cycle, wherein the indications for the behavior of the user equipment are indicating to monitor the wake-up signal for the at least one period of time only when the long discontinuous reception cycle is being used, wherein the indications to dynamically control the monitoring of the wake-up signal for the decoding are indicating that when the short discontinuous reception cycle is being used to monitor the next on-duration start for the wake-up signal without monitoring for the wake-up signal in advance of the next on-duration start, wherein the indications to dynamically control the monitoring of the wake-up signal for the decoding comprise an indication to monitor a further discontinuous reception cycle enabled after one of the long discontinuous reception or the short discontinuous reception has been monitored for a period of time, wherein the indications to dynamically control the monitoring of the wake-up signal for the decoding comprise an indication to monitor for the wake-up signal for the at least one period of time before a start of the next on duration if there was no communication of uplink data or downlink data was performed during a previous active time for the user equipment, wherein for a case there was no uplink data or downlink data performed during the previous active time, the indications to dynamically control the monitoring of the wake-up signal for the decoding comprise an indication to monitor the on-duration without monitoring the wake-up signal in advance, wherein for a case there was uplink data or downlink data performed during the previous active time, the indications to dynamically control the monitoring of the wake-up signal for the decoding comprise an indication to monitor for the wake-up signal in advance, and wherein the indication to monitor for the wake-up signal in advance is based on an acknowledgement being received by the user equipment in response to uplink data being performed during the previous active time for the user equipment.

In another example aspect of the invention, there is a method comprising: receiving from a network node, by a user equipment, information of at least one period of time that the user equipment is to monitor for a wake-up signal to decode, where the information comprises indications of at least one of a configuration or a behavior for the user equipment to dynamically control the monitoring of the wake-up signal for the decoding. Then using the information to perform the monitoring of the wake-up signal for the decoding.

Further example embodiments include a method comprising the method of the previous paragraph, wherein the indications are of a configuration to dynamically control the monitoring of the wake-up signal for the decoding are indicating whether or not to monitor the wake-up signal for the at least one period of time before an on-duration start assigned to the user equipment, wherein the on-duration start is for a next on-duration assigned to the user equipment, wherein the indications are of a configuration to dynamically control the monitoring of the wake-up signal for the decoding are using a medium access control element associated with the signaling, wherein the indications to dynamically control the monitoring of the wake-up signal for the decoding are using downlink control information associated with the signaling, wherein the indications are of a configuration to dynamically control the monitoring of the wake-up signal for the decoding comprise an indication of a number of discontinuous reception cycles of the user equipment to one of monitor for the wake-up signal or not monitor for the wake-up signal, wherein the indications are of a configuration identifying to the user equipment to monitor the wake-up signal for the at least one period of time before the next on-duration start, wherein the indications are for a behavior of the user equipment to monitor for the wake-up signal only during one of a short discontinuous reception cycle or a long discontinuous reception cycle, wherein the indications for the behavior of the user equipment are indicating to monitor the wake-up signal for the at least one period of time only when the long discontinuous reception cycle is being used, wherein the indications to dynamically control the monitoring of the wake-up signal for the decoding are indicating that when the short discontinuous reception cycle is being used to monitor the next on-duration start for the wake-up signal without monitoring for the wake-up signal in advance of the next on-duration start, wherein the indications to dynamically control the monitoring of the wake-up signal for the decoding comprise an indication to monitor a further discontinuous reception cycle enabled after one of the long discontinuous reception or the short discontinuous reception has been monitored for a period of time, wherein the indications to dynamically control the monitoring of the wake-up signal for the decoding comprise an indication to monitor for the wake-up signal for the at least one period of time before a start of the next on duration if there was no communication of uplink data or downlink data was performed during a previous active time for the user equipment, wherein for a case there was no uplink data or downlink data performed during the previous active time, the indications to dynamically control the monitoring of the wake-up signal for the decoding comprise an indication to monitor the on-duration without monitoring the wake-up signal in advance, wherein for a case there was uplink data or downlink data performed during the previous active time, the indications to dynamically control the monitoring of the wake-up signal for the decoding comprise an indication to monitor for the wake-up signal in advance, and wherein the indication to monitor for the wake-up signal in advance is based on an acknowledgement being received by the user equipment in response to uplink data being performed during the previous active time for the user equipment.

In an example aspect of the invention, there is an apparatus, such as a user side apparatus, comprising: means for receiving from a network node, by a user equipment, information of at least one period of time that the user equipment is to monitor for a wake-up signal to decode, where the information comprises indications of at least one of a configuration or a behavior for the user equipment to dynamically control the monitoring of the wake-up signal for the decoding; and means for using the information to perform the monitoring of the wake-up signal for the decoding.

Further example embodiments include an apparatus comprising the apparatus of the previous paragraph, wherein the indications are of a configuration to dynamically control the monitoring of the wake-up signal for the decoding are indicating whether or not to monitor the wake-up signal for the at least one period of time before an on-duration start assigned to the user equipment, wherein the on-duration start is for a next on-duration assigned to the user equipment, wherein the indications are of a configuration to dynamically control the monitoring of the wake-up signal for the decoding are using a medium access control element associated with the signaling, wherein the indications to dynamically control the monitoring of the wake-up signal for the decoding are using downlink control information associated with the signaling, wherein the indications are of a configuration to dynamically control the monitoring of the wake-up signal for the decoding comprise an indication of a number of discontinuous reception cycles of the user equipment to one of monitor for the wake-up signal or not monitor for the wake-up signal, wherein the indications are of a configuration identifying to the user equipment to monitor the wake-up signal for the at least one period of time before the next on-duration start, wherein the indications are for a behavior of the user equipment to monitor for the wake-up signal only during one of short discontinuous reception cycle or a long discontinuous reception cycle, wherein the indications for the behavior of the user equipment are indicating to monitor the wake-up signal for the at least one period of time only when the long discontinuous reception cycle is being used, wherein the indications to dynamically control the monitoring of the wake-up signal for the decoding are indicating that when the short discontinuous reception cycle is being used to monitor the next on-duration start for the wake-up signal without monitoring for the wake-up signal in advance of the next on-duration start, wherein the indications to dynamically control the monitoring of the wake-up signal for the decoding comprise an indication to monitor a further discontinuous reception cycle enabled after one of the long discontinuous reception or the short discontinuous reception has been monitored for a period of time, wherein the indications to dynamically control the monitoring of the wake-up signal for the decoding comprise an indication to monitor for the wake-up signal for the at least one period of time before a start of the next on duration if there was no communication of uplink data or downlink data was performed during a previous active time for the user equipment, wherein for a case there was no uplink data or downlink data performed during the previous active time, the indications to dynamically control the monitoring of the wake-up signal for the decoding comprise an indication to monitor the on-duration without monitoring the wake-up signal in advance, wherein for a case there was uplink data or downlink data performed during the previous active time, the indications to dynamically control the monitoring of the wake-up signal for the decoding comprise an indication to monitor for the wake-up signal in advance, and wherein the indication to monitor for the wake-up signal in advance is based on an acknowledgement being received by the user equipment in response to uplink data being performed during the previous active time for the user equipment.

In accordance with the example embodiments as described in the paragraph above, at least the means for receiving and using comprises a network interface, and computer program code stored on a computer-readable medium and executed by at least one processor.

In the example aspect of the invention according to the paragraph above, wherein at least the means for receiving and using comprises a transceiver [TRANS 10D, TRANS 12D, TRANS 13D, and/or TRANS 14D as in FIG. 4] a non-transitory computer readable medium [MEM 10A, MEM 12B, MEM 13B, and/or MEM 14B as in FIG. 4] encoded with a computer program [PROG 10C, PROG 12C, PROG 13C, and/or PROG 14C as in FIG. 4] executable by at least one processor [DP 10A, DP 12A, DP 13A, and/or DP 14A as in FIG. 4].

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which.

DETAILED DESCRIPTION

Figure 1:
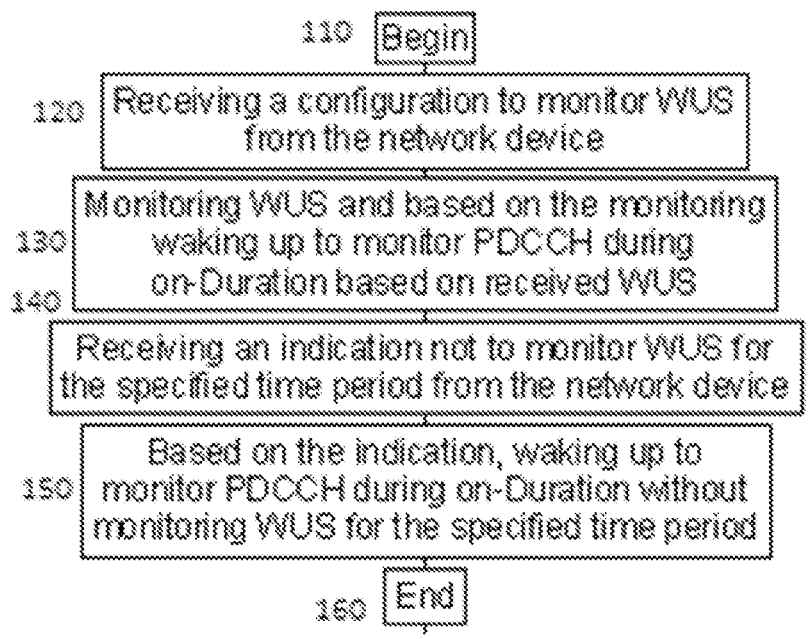
FIG. 1 shows an example illustration of one method of a first alternative in accordance with an example embodiment of the invention.

In example embodiments of this invention, there is proposed novel and improved wake-up signal (WUS) control and configuration operations, and more specifically provides these operations which enable a user equipment to dynamically adapt its monitoring and usage of wake-up signal (WUS) control and configuration operations.

It is noted that at the time of this application a 3GPP RAN2 group has been conducting study items for UE power saving. In such 3gpp meetings there was discussed:
1. RAN2 will study the RAN2 impact of wake up signaling to C-DRX;
2. Wakeup signaling is linked to C-DRX and is only configured when C-DRX is configured. If the WUS is not configured legacy operations apply; and
3. If configured with WUS, UE should monitor for WUS occasions at a known offset before on duration C-DRX. The offset is up to RAN1 discussion.

Based on this, the WUS is used by a device such as a UE to determine whether to wake up for the next on-Duration or not. Unless the WUS is received, the UE will not wake up and can continue sleeping. The on-Duration may be associated to at least one DRX configuration provided to the UE. On-Duration may be referred to as the duration at the beginning of a DRX cycle and when the on-Duration is running (which may be dictated by a timer/drx-onDuration-Timer) the UE may be in Active Time and monitoring control information from the network device. In other words, unless the WUS is received, the UE may not start the drx-onDurationTimer and can continue sleeping. The Active Time may be generally referred to time when the UE may be monitoring control information or control channel (such as PDCCH) from the network device.

Furthermore, it has been agreed at the time of this application that:
The PDCCH-based power saving signal/channel is UE-specifically configured; and
The DCI format(s) contain information for (including potential down-selection, which may or may not depend on power saving techniques/scenarios):
Alt 1: triggering a single UE only
Alt 2: triggering UE(s) within a group
FFS whether to always trigger all UEs in a group or a subset of it
Alt 3: Alt 1 & Alt 2
The PDCCH-based power saving signal/channel is basically at least the WUS (Wake-Up Signal) discussed in the RAN2 agreements. Furthermore, as can be seen, RAN1 is also considering the WUS to be UE group specific in which case the WUS could wake up multiple UEs to monitor on-Duration at the next occasion.

It is noted that low-bit count signals may be used as a WUS. A receiver, or a portion of a receiver of a device, may be used to monitor for the wake-up signal. Such a receiver may be referred to as a "wake-up receiver" (WUR). The WUR can use low power receiver circuitry that is incorporated into the device or may be incorporated in part in another device and/or communication device. The receiver can be configured to monitor for and receive wake-up signals. Then process the wake-up signal in order to awaken the receiver only when a communication is destined for that UE. Example embodiments of the invention work to improve at least receiving operations of a WUS.

Figure 4:
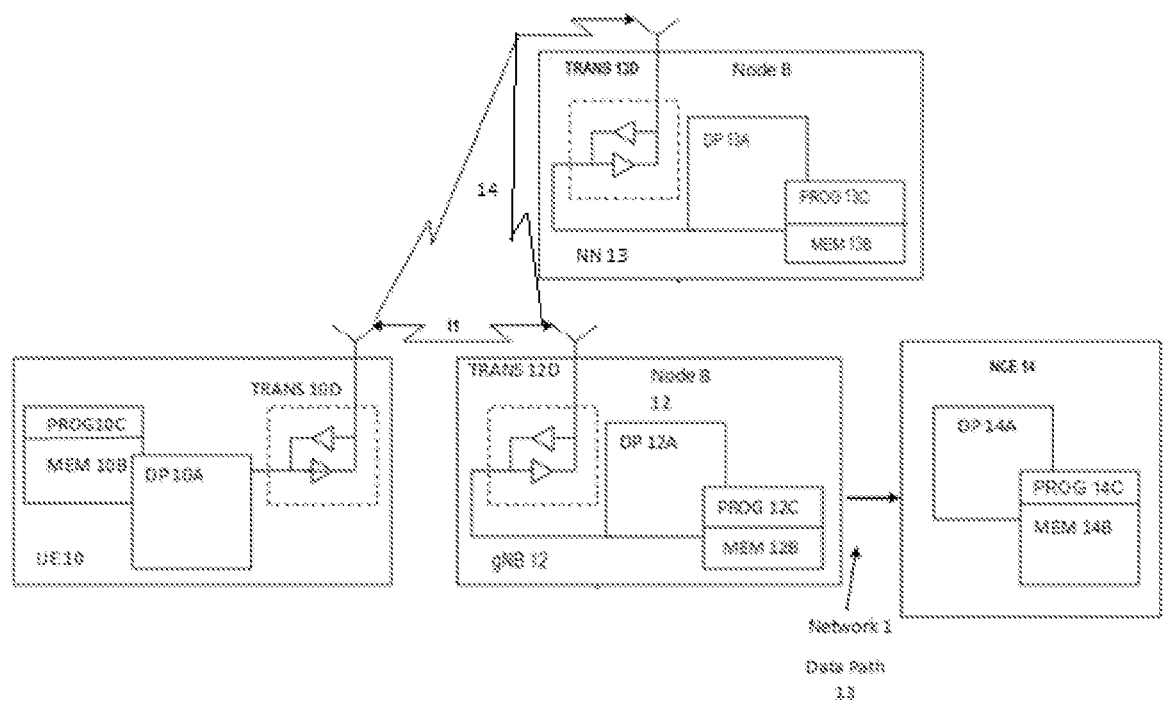
FIG. 4 shows a high level block diagram of various devices used in carrying out various aspects of the invention.

Before describing the example embodiments of the invention in detail, reference is made to FIG. 4 for illustrating a simplified block diagram of various electronic devices that are suitable for use in practicing the example embodiments of this invention.

FIG. 4 shows a block diagram of one possible and non-limiting exemplary system in which the example embodiments of the invention may be practiced. In FIG. 4, a user equipment (UE) 10 is in wireless communication with a wireless network 1. A UE is a wireless, typically mobile device that can access a wireless network. The UE 10 includes one or more processors DP 10A, one or more memories MEM 10B, and one or more transceivers TRANS 10D interconnected through one or more buses. Each of the one or more transceivers TRANS 10D includes a receiver and a transmitter. The one or more buses may be address, data, or control buses, and may include any interconnection mechanism, such as a series of lines on a motherboard or integrated circuit, fiber optics or other optical communication equipment, and the like. The one or more transceivers TRANS 10D are connected to one or more antennas for communication 11 and 18 to gNB 12 and NN 13, respectively. The one or more memories MEM 10B include computer program code PROG 10C. The UE 10 communicates with gNB 12 and/or NN 13 via a wireless link 111.

The gNB 12 (NR/5G Node B or possibly an evolved NB) is a base station such as a master or secondary node base station (e.g., for NR or LTE long term evolution) that communicates with devices such as NN 13 and UE 10 of FIG. 4. The gNB 12 provides access to wireless devices such as the UE 10 to the wireless network 1. The gNB 12 includes one or more processors DP 12A, one or more memories MEM 12C, and one or more transceivers TRANS 12D interconnected through one or more buses. In accordance with the example embodiments these TRANS 12D can include X2 and/or Xn interfaces for use to perform the example embodiments of the invention. Each of the one or more transceivers TRANS 12D includes a receiver and a transmitter. The one or more transceivers TRANS 12D are connected to one or more antennas for communication over at least link 11 with the UE 10. The one or more memories MEM 12B and the computer program code PROG 12C are configured to cause, with the one or more processors DP 12A, the gNB 12 to perform one or more of the operations as described herein. The gNB 12 may communicate with another gNB or eNB, or a device such as the NN 13. Further, the link 11 and or any other link may be wired or wireless or both and may implement, e.g., an X2 or Xn interface. Further the link 11 may be through other network devices such as, but not limited to an NCE/MME/SGW device such as the NCE 14 of FIG. 4.

The NN 13 can comprise a mobility function device such as an AMF or SMF, further the NN 13 may comprise a NR/5G Node B or possibly an evolved NB a base station such as a master or secondary node base station (e.g., for NR or LTE long term evolution) that communicates with devices such as the gNB 12 and/or UE 10 and/or the wireless network 1. The NN 13 includes one or more processors DP 13A, one or more memories MEM 13B, one or more network interfaces, and one or more transceivers TRANS 12D interconnected through one or more buses. In accordance with the example embodiments these network interfaces of NN 13 can include X2 and/or Xn interfaces for use to perform the example embodiments of the invention. Each of the one or more transceivers TRANS 13D includes a receiver and a transmitter connected to one or more antennas. The one or more memories MEM 13B include computer program code PROG 13C. For instance, the one or more memories MEM 13B and the computer program code PROG 13C are configured to cause, with the one or more processors DP 13A, the NN 13 to perform one or more of the operations as described herein. The NN 13 may communicate with another mobility function device and/or eNB such as the gNB 12 and the UE 10 or any other device using, e.g., link 11 or another link. These links maybe wired or wireless or both and may implement, e.g., an X2 or Xn interface. Further, as stated above the link 11 may be through other network devices such as, but not limited to an NCE/MME/ SGW device such as the NCE 14 of FIG. 4.

The one or more buses of the device of FIG. 4 may be address, data, or control buses, and may include any interconnection mechanism, such as a series of lines on a motherboard or integrated circuit, fiber optics or other optical communication equipment, wireless channels, and the like. For example, the one or more transceivers TRANS 12D, TRANS 13D and/or TRANS 10D may be implemented as a remote radio head (RRH), with the other elements of the gNB 12 being physically in a different location from the RRH, and the one or more buses 157 could be implemented in part as fiber optic cable to connect the other elements of the gNB 12 to a RRH.

It is noted that although FIG. 4 shows a network node or base station such as the gNB 12 as in FIG. 4 and mobility management device such as the NN 13 as in FIG. 4, these devices can incorporate or be incorporated into an eNodeB or eNB such as for LTE and NR, and would still be configurable to perform example embodiments of the invention.

Also it is noted that description herein indicates that "cells" perform functions, but it should be clear that the gNB that forms the cell and/or a user equipment and/or mobility management function device that will perform the functions. In addition, the cell makes up part of a gNB, and there can be multiple cells per gNB.

The wireless network 1 may include a network control element (NCE) 14 that may include MME (Mobility Management Entity)/SGW (Serving Gateway) functionality, and which provides connectivity with a further network, such as a telephone network and/or a data communications network (e.g., the Internet). The gNB 12 and the NN 13 are coupled via a link 13 and/or link 14 to the NCE 14. In addition, it is noted that the operations in accordance with example embodiments of the invention, as performed by the NN 13, may also be performed at the NCE 14.

The NCE 14 includes one or more processors DP 14A, one or more memories MEM 14B, and one or more network interfaces (N/W I/F(s)), interconnected through one or more buses coupled with the link 13 and/or 14. In accordance with the example embodiments these network interfaces can include X2 and/or Xn interfaces for use to perform the example embodiments of the invention. The one or more memories MEM 14B include computer program code PROG 14C. The one or more memories MEM14B and the computer program code PROG 14C are configured to, with the one or more processors DP 14A, cause the NCE 14 to perform one or more operations which may be needed to support the operations in accordance with the example embodiments of the invention.

The wireless Network 1 may implement network virtualization, which is the process of combining hardware and software network resources and network functionality into a single, software-based administrative entity, a virtual network.

Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors DP10, DP12A, DP13A, and/or DP14A and memories MEM 10B, MEM 12B, MEM 13B, and/or MEM 14B, and also such virtualized entities create technical effects.

The computer readable memories MEM 12B, MEM 13B, and MEM 14B may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories MEM 12B, MEM 13B, and MEM 14B may be means for performing storage functions. The processors DP10, DP12A, DP13A, and DP14A may be of any type suitable to the local technical environment, and may include one or more of general purpose computers, special purpose computers, microprocessors, digital signal processors (DSPs) and processors based on a multi-core processor architecture, as non-limiting examples. The processors DP10, DP12A, DP13A, and DP14A may be means for performing functions, such as controlling the UE 10, gNB 12, NN 13, and other functions as described herein.

Below, example embodiments of the invention are described in further detail. When UE is configured to monitor WUS before on-Duration, the options below that are in accordance with an example embodiment of the invention are proposed to provide dynamic control of the UE monitoring WUS.

In these options in accordance with example embodiments of the invention:

the NW can indicate whether the UE shall monitor WUS before the next on-Duration start or not (i.e., wake up for on-Duration without monitoring WUS):

This indication can be in the form of MAC CE or indicated in a DCI or it could be part of the most recent WUS signal itself, The indication may consist of how many DRX cycle periods the WUS should/should not be monitored, or the indication only concerns the next on-Duration, or alternatively, the NW indicates when to start monitoring WUS again; and NW can indicate whether the UE shall monitor WUS before the next on-Duration start only if the Long or Short DRX cycle is used:

wherein the indication comprises a configuration by RRC signaling when the DRX and/or WUS is configured;

UE could be configured/indicated to monitor WUS only when Long DRX cycle is used but monitor on-Duration always when Short DRX cycle is used without monitoring WUS in advance, or Alternatively, WUS monitoring could be a third DRX cycle state which is enabled after Long DRX cycle has been monitored for some time (e.g., number of cycles), i.e., the procedure would go like Short DRX cycle→Long DRX cycle→WUS cycle (which could be equal to Long DRX cycle but with WUS listened before on-Duration); and NW can indicate whether the UE shall monitor WUS before the next on-Duration start in case there was UL or DL data in the previous active time:

i.e., UE could be configured to monitor on-Duration without monitoring WUS in advance if there were data activity in the previous active time. Otherwise, the UE should monitor WUS, and This may also depend on whether ACK was received on transmitted UL data during the previous active time; and/or Combination of above options.

FIG. 1 shows an example illustration of one method of a first alternative in accordance with an example embodiment of the invention. As shown after beginning at 110 receiving a configuration to monitor WUS from the network device. In step 130 of FIG. 1 there is monitoring WUS and based on the monitoring waking up to monitor PDCCH during on-Duration based on received WUS. In step 140 of FIG. 1 there is Receiving an indication not to monitor WUS for specified time period from the network device. As shown in step 150 of FIG. 1 there is Based on the indication, waking up to monitor PDCCH during on-Duration without monitoring WUS for the specified time period. Then at step 160 of FIG. 1 there is an End.

Figure 2:
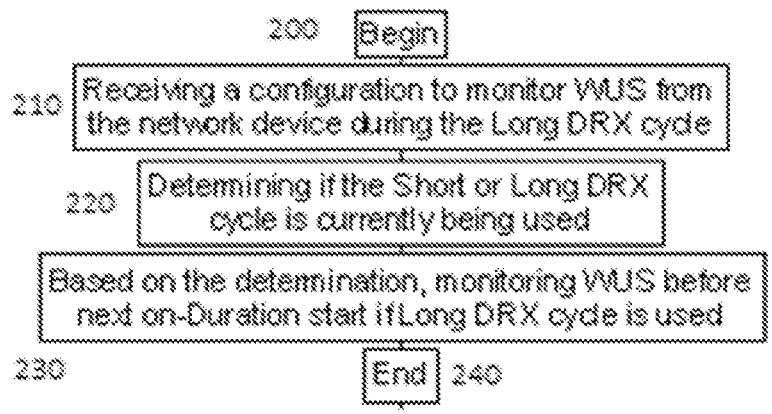
FIG. 2 shows an example illustration of another method of another alternative in accordance with an example embodiment of the invention.

FIG. 2 shows an example illustration of another method of another alternative in accordance with an example embodiment of the invention. As shown after beginning at 200 of FIG. 2 receiving a configuration 210 to monitor WUS from the network device during Long DRX cycle. In step 220 of FIG. 2 there is Determining if Short or Long DRX cycle is currently being used. As shown in step 230 of FIG. 2 there is, based on the determination, monitoring WUS before next on-Duration start if Long DRX cycle is used. Then at step 240 of FIG. 2 there is an End.

In some examples, the step 210 above could also be specified how the UE should behave; for instance, it may be specified the UE will monitor WUS from the network device only during Long DRX cycle or Short DRX cycle. In some further examples, the UE may be configured to monitor WUS from the network device during Short DRX cycle after a configured number of Short DRX cycles. In other words, for example, UE may be configured not to monitor WUS from the network device during first #X Short DRX cycles and may be configured to monitor WUS from the network device after the first #X Short DRX cycles. The number of Short DRX cycles the UE monitors Short DRX cycle may be dictated by a drx-ShortCycleTimer. The drx-ShortCycleTimer may be configured in multiples of Short DRX cycle lengths, for instance, drx-ShortCycle.

Figure 3:
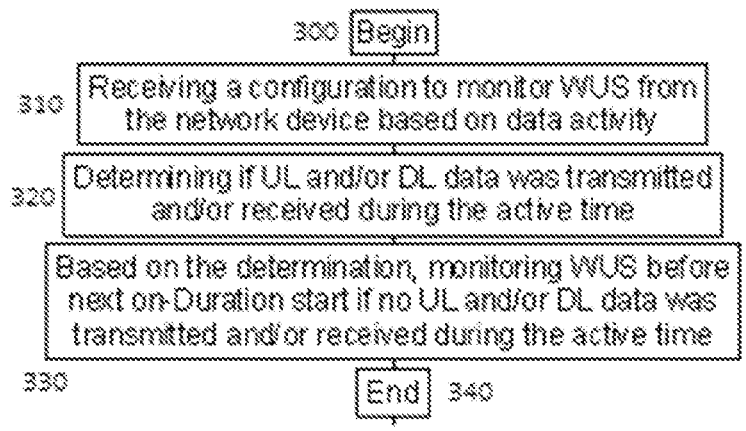
FIG. 3 shows an example illustration of one method of still another alternative in accordance with an example embodiment of the invention.

FIG. 3 shows an example illustration of one method of still another alternative in accordance with an example embodiment of the invention. As shown after beginning at 300 of FIG. 3 receiving a configuration 310 to monitor WUS from the network device based on data activity. As shown in step 320 of FIG. 3 there is Determining if UL and/or DL data was transmitted and/or received during the active time. As shown in step 330 of FIG. 3 there is Based on the determination, monitoring WUS before next on-Duration start if no UL and/or DL data was transmitted and/or received during the active time. Then at step 340 of FIG. 3 there is an End.

Figure 5A:
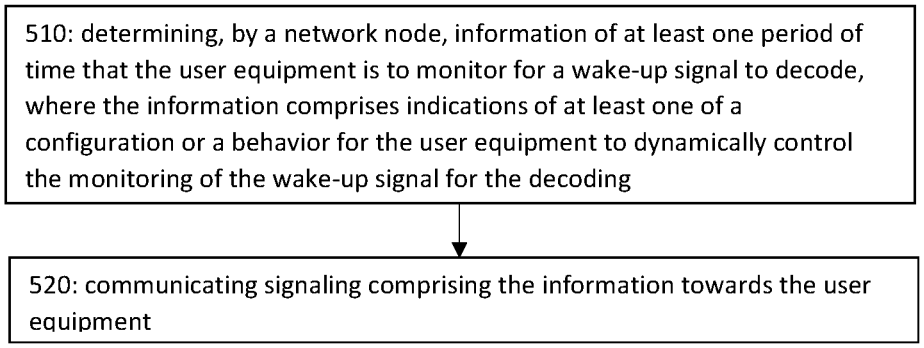
FIG. 5A and FIG. 5B each show a method which may be performed by an apparatus in accordance with example embodiments of the invention.

FIG. 5A illustrates operations which may be performed by a device such as, but not limited to, a network node associated with a device such as the gNB 12, NN 13, UE 10, and/or NCE 14 as in FIG. 4. As shown in step 510 of FIG. 5A there is determining, by a network node, information of at least one period of time that a user equipment is to monitor for a wake-up signal to decode, where the information comprises indications of at least one of a configuration or a behavior for the user equipment to dynamically control the monitoring of the wake-up signal for the decoding. Then as shown in step 520 of FIG. 5A there is communicating signaling comprising the information towards the user equipment.

In accordance with an example aspect of an example embodiment of the invention as described in the paragraph above, wherein the indications are of a configuration to dynamically control monitoring of the wake-up signal for the decoding are indicating whether or not to monitor the wake-up signal for the at least one period of time before an on-duration start assigned to the user equipment.

In accordance with an example aspect of an example embodiment of the invention as described in the paragraphs above, wherein the on-duration start is for a next on-duration assigned to the user equipment.

In accordance with an example aspect of an example embodiment of the invention as described in the paragraphs above, wherein the indications are of a configuration to dynamically control monitoring of the wake-up signal for the decoding are using a medium access control element associated with the signaling.

In accordance with an example aspect of an example embodiment of the invention as described in the paragraphs above, wherein the indications are of a configuration to dynamically control decoding of the wake-up signal are using downlink control information associated with the signaling.

In accordance with an example aspect of an example embodiment of the invention as described in the paragraphs above, wherein the indications are of a configuration to dynamically control the monitoring of the wake-up signal for the decoding comprise an indication of a number of discontinuous reception cycles of the user equipment to one of monitor for the wake-up signal or not monitor for the wake-up signal.

In accordance with an example aspect of an example embodiment of the invention as described in the paragraphs above, wherein the indications are of a configuration identifying to the user equipment to monitor the wake-up signal for the at least one period of time before the next on-duration start.

In accordance with an example aspect of an example embodiment of the invention as described in the paragraphs above, wherein the indications are for a behavior of the user equipment to monitor for the wake-up signal only during one of a short discontinuous reception cycle or a long discontinuous reception cycle.

In accordance with an example aspect of an example embodiment of the invention as described in the paragraphs above, wherein the indications for the behavior of the user equipment are indicating to monitor the wake-up signal for the at least one period of time only when the long discontinuous reception cycle is being used.

In accordance with an example aspect of an example embodiment of the invention as described in the paragraphs above, wherein the indications to dynamically control the monitoring of the wake-up signal for the decoding are indicating that when the short discontinuous reception cycle is being used to monitor the next on-duration start for the wake-up signal without monitoring for the wake-up signal in advance of the next on-duration start.

In accordance with an example aspect of an example embodiment of the invention as described in the paragraphs above, wherein the indications to dynamically control the monitoring of the wake-up signal for the decoding comprise an indication to monitor a further discontinuous reception cycle enabled after one of the long discontinuous reception or the short discontinuous reception has been monitored for a period of time.

In accordance with an example aspect of an example embodiment of the invention as described in the paragraphs above, wherein the indications to dynamically control the monitoring of the wake-up signal for the decoding comprise an indication to monitor for the wake-up signal for the at least one period of time before a start of the next on duration if there was no communication of uplink data or downlink data was performed during a previous active time for the user equipment.

In accordance with an example aspect of an example embodiment of the invention as described in the paragraphs above, wherein for a case there was no uplink data or downlink data performed during the previous active time, the indications to dynamically control the monitoring of the wake-up signal for the decoding comprise an indication to monitor the on-duration without monitoring the wake-up signal in advance.

In accordance with an example aspect of an example embodiment of the invention as described in the paragraphs above, wherein for a case there was uplink data or downlink data performed during the previous active time, the indications to dynamically control the monitoring of the wake-up signal for the decoding comprise an indication to monitor for the wake-up signal in advance.

In accordance with an example aspect of an example embodiment of the invention as described in the paragraphs above, wherein the indication to monitor for the wake-up signal in advance is based on an acknowledgement being received by the user equipment in response to uplink data being performed during the previous active time for the user equipment.

A non-transitory computer-readable medium (MEM 10B, MEM 12B, MEM 13B, and/or MEM 13B as in FIG. 2) storing program code (PROG 10C, PROG 12C, PROG 13C, and/or PROG 14C as in FIG. 2), the program code executed by at least one processor (DP 10A, DP 12A DP 13A, and/or DP 14A as in FIG. 2) to perform the operations as at least described in the paragraphs above.

In accordance with an example embodiment of the invention as described above there is an apparatus comprising: means for determining (TRANS 10D, TRANS 12D, and/or TRANS 13D; MEM 10B, MEM 12B, MEM 13B, and/or MEM 13B; PROG 10C, PROG 12C, PROG 13C, and/or PROG 14C; and DP 10A, DP 12A DP 13A, and/or DP 14A as in FIG. 4), by a network node (gNB 12, NN 113, and/or NCE 14 as in FIG. 4), information of at least one period of time that the user equipment (UE 10 as in FIG. 4) is to monitor for a wake-up signal to decode, where the information comprises indications of at least one of a configuration or a behavior for the user equipment to dynamically control the monitoring of the wake-up signal for the decoding. Then as shown in step 520 of FIG. 5A there is communicating (TRANS 10D, TRANS 12D, and/or TRANS 13D; MEM 10B, MEM 12B, MEM 13B, and/or MEM 13B; PROG 10C, PROG 12C, PROG 13C, and/or PROG 14C; and DP 10A, DP 12A DP 13A, and/or DP 14A as in FIG. 4) signaling comprising the information towards the user equipment.

In the example aspect of the invention according to the paragraph above, wherein at least the means for determining and communicating comprises a transceiver [TRANS 10D, TRANS 12D, TRANS 13D, and/or TRANS 14D as in FIG. 4] a non-transitory computer readable medium [MEM 10A, MEM 12B, MEM 13B, and/or MEM 14B as in FIG. 4] encoded with a computer program [PROG 10C, PROG 12C, PROG 13C, and/or PROG 14C as in FIG. 4] executable by at least one processor [DP 10A, DP 12A, DP 13A, and/or DP 14A as in FIG. 4].

Figure 5B:
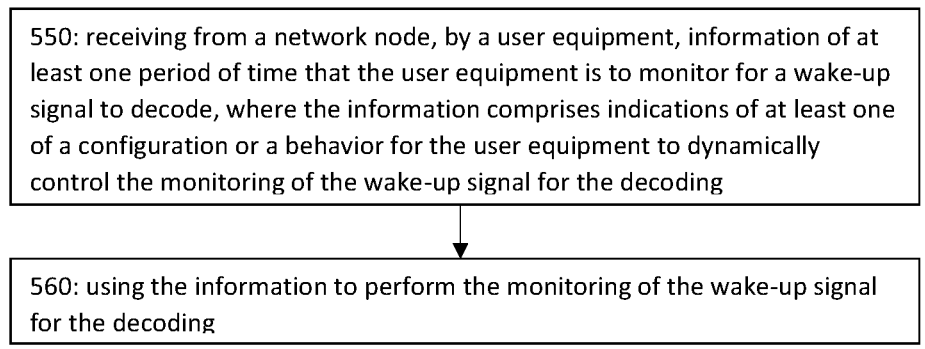

FIG. 5B illustrates operations which may be performed by a device such as, but not limited to, a device (e.g., UE 10, gNB 12, NN 13, and/or NCE 14 as in FIG. 4). As shown in step 550 of FIG. 5B there is receiving from a network node, by a user equipment, information of at least one period of time that the user equipment is to monitor for a wake-up signal to decode, where the information comprises indications of at least one of a configuration or a behavior for the user equipment to dynamically control the monitoring of the wake-up signal for the decoding. Then as shown in step 560 of FIG. 5B there is using the information to perform the monitoring of the wake-up signal for the decoding.

In accordance with an example aspect of an example embodiment of the invention as described in the paragraph above, wherein the indications are of a configuration to dynamically control the monitoring of the wake-up signal for the decoding are indicating whether or not to monitor the wake-up signal for the at least one period of time before an on-duration start assigned to the user equipment.

In accordance with an example aspect of an example embodiment of the invention as described in the paragraphs above, wherein the on-duration start is for a next on-duration assigned to the user equipment.

In accordance with an example aspect of an example embodiment of the invention as described in the paragraphs above, wherein the indications are of a configuration to dynamically control the monitoring of the wake-up signal for the decoding are using a medium access control element associated with the signaling.

In accordance with an example aspect of an example embodiment of the invention as described in the paragraphs above, wherein the indications to dynamically control the monitoring of the wake-up signal for the decoding are using downlink control information associated with the signaling.

In accordance with an example aspect of an example embodiment of the invention as described in the paragraphs above, wherein the indications are of a configuration to dynamically control the monitoring of the wake-up signal for the decoding comprise an indication of a number of discontinuous reception cycles of the user equipment to one of monitor for the wake-up signal or not monitor for the wake-up signal.

In accordance with an example aspect of an example embodiment of the invention as described in the paragraphs above, wherein the indications are of a configuration identifying to the user equipment to monitor the wake-up signal for the at least one period of time before the next on-duration start.

In accordance with an example aspect of an example embodiment of the invention as described in the paragraphs above, wherein the indications are for a behavior of the user equipment to monitor for the wake-up signal only during one of a short discontinuous reception cycle or a long discontinuous reception cycle.

In accordance with an example aspect of an example embodiment of the invention as described in the paragraphs above, wherein the indications for the behavior of the user equipment are indicating to monitor the wake-up signal for the at least one period of time only when the long discontinuous reception cycle is being used.

In accordance with an example aspect of an example embodiment of the invention as described in the paragraphs above, wherein the indications to dynamically control the monitoring of the wake-up signal for the decoding are indicating that when the short discontinuous reception cycle is being used to monitor the next on-duration start for the wake-up signal without monitoring for the wake-up signal in advance of the next on-duration start.

In accordance with an example aspect of an example embodiment of the invention as described in the paragraphs above, wherein the indications to dynamically control the monitoring of the wake-up signal for the decoding comprise an indication to monitor a further discontinuous reception cycle enabled after one of the long discontinuous reception or the short discontinuous reception has been monitored for a period of time.

In accordance with an example aspect of an example embodiment of the invention as described in the paragraphs above, wherein the indications to dynamically control the monitoring of the wake-up signal for the decoding comprise an indication to monitor for the wake-up signal for the at least one period of time before a start of the next on duration if there was no communication of uplink data or downlink data was performed during a previous active time for the user equipment.

In accordance with an example aspect of an example embodiment of the invention as described in the paragraphs above, wherein for a case there was no uplink data or downlink data performed during the previous active time, the indications to dynamically control the monitoring of the wake-up signal for the decoding comprise an indication to monitor the on-duration without monitoring the wake-up signal in advance.

In accordance with an example aspect of an example embodiment of the invention as described in the paragraphs above, wherein for a case there was uplink data or downlink data performed during the previous active time, the indications to dynamically control the monitoring of the wake-up signal for the decoding comprise an indication to monitor for the wake-up signal in advance.

In accordance with an example aspect of an example embodiment of the invention as described in the paragraphs above, wherein the indication to monitor for the wake-up signal in advance is based on an acknowledgement being received by the user equipment in response to uplink data being performed during the previous active time for the user equipment.

A non-transitory computer-readable medium (MEM 10B, MEM 12B, MEM 13B, and/or MEM 13B as in FIG. 2) storing program code (PROG 10C, PROG 12C, PROG 13C, and/or PROG 14C as in FIG. 2), the program code executed by at least one processor (DP 10A, DP 12A DP 13A, and/or DP 14A as in FIG. 2) to perform the operations as at least described in the paragraphs above.

In accordance with an example embodiment of the invention as described above there is an apparatus comprising: means for receiving (TRANS 10D, TRANS 12D, and/or TRANS 13D; MEM 10B, MEM 12B, MEM 13B, and/or MEM 13B; PROG 10C, PROG 12C, PROG 13C, and/or PROG 14C; and DP 10A, DP 12A DP 13A, and/or DP 14A as in FIG. 4), by a network node (gNB 12, NN 113, and/or NCE 14 as in FIG. 4), from a network node (gNB 12, NN 113, and/or NCE 14 as in FIG. 4), by a user equipment (UE 10 as in FIG. 5B), information of at least one period of time that the user equipment is to monitor for a wake-up signal to decode, where the information comprises indications of at least one of a configuration or a behavior for the user equipment to dynamically control the monitoring of the wake-up signal for the decoding. Then as shown in step 560 of FIG. 5B there is using (TRANS 10D, TRANS 12D, and/or TRANS 13D; MEM 10B, MEM 12B, MEM 13B, and/or MEM 13B; PROG 10C, PROG 12C, PROG 13C, and/or PROG 14C; and DP 10A, DP 12A DP 13A, and/or DP 14A as in FIG. 4) the information to perform the monitoring of the wake-up signal for the decoding.

In the example aspect of the invention according to the paragraph above, wherein at least the means for receiving and using comprises a transceiver [TRANS 10D, TRANS 12D, TRANS 13D, and/or TRANS 14D as in FIG. 4] a non-transitory computer readable medium [MEM 10A, MEM 12B, MEM 13B, and/or MEM 14B as in FIG. 4] encoded with a computer program [PROG 10C, PROG 12C, PROG 13C, and/or PROG 14C as in FIG. 4] executable by at least one processor [DP 10A, DP 12A, DP 13A, and/or DP 14A as in FIG. 4].

It is noted that example embodiments of the invention can provide at least the benefits of:
  Providing dynamic means to control UE decoding of WUS signal;
  Decreasing power consumption of current standards caused by wake-up signalling determinations associated with a data transmission expected to happen in the next on-Duration, the improvements for at least WUS decoding which can be seen as not as useful as it only increases UE power consumption; and
  For group WUS, example embodiments of the invention as discussed herein can prevent other UEs waking up in vain when data transmission is expected to happen for certain UE.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A network node comprising:
   at least one processor; and
   at least one memory including computer program code, wherein the at least one memory and the computer program code are configured to, with the at least one processor, cause the network node at least to:
   determine information associated with at least one period of time that a user equipment is to monitor for a wake-up signal to decode, wherein the information comprises an indication for the user equipment to dynamically control monitoring for the wake-up signal to decode, wherein the indication indicates whether or not to monitor the wake-up signal for the at least one period of time before a next on-duration start assigned to the user equipment, and wherein the indication only concerns the next on-duration; and
   transmitting, using the network node, towards the user equipment, signaling comprising the information associated with the at least one period of time for monitoring for the wake-up signal to decode.

2. The network node of claim 1, wherein the indication is provided via a medium access control element, a downlink control information, or a most recent wake-up signal.

3. The network node of claim 1, wherein the indication comprises an indication to monitor for the wake-up signal only during one of a short discontinuous reception cycle or a long discontinuous reception cycle.

4. The network node of claim 3, wherein the indication comprises an indication to monitor the wake-up signal for the at least one period of time only when the long discontinuous reception cycle is being used.

5. The network node of claim 3, wherein the indication comprises an indication that, when the short discontinuous reception cycle is being used, to monitor a next on-duration start for the wake-up signal without monitoring for the wake-up signal in advance of the next on-duration start.

6. The network node of claim 1, wherein the indication comprises an indication to monitor for the wake-up signal for the at least one period of time before a start of the next on-duration if no communication of uplink data or downlink data was performed during a previous active time for the user equipment.

7. The network node of claim 6, wherein, in an instance in which no communication of uplink data or downlink data was performed during the previous active time, the indication comprises an indication to monitor the on-duration without monitoring the wake-up signal in advance.

8. The network node of claim 6, wherein, in an instance in which communication of uplink data or downlink data was performed during the previous active time, the indication comprises an indication to monitor for the wake-up signal in advance.

9. The network node of claim 8, wherein the indication to monitor for the wake-up signal in advance is based on an acknowledgement being received by the user equipment in response to communication of uplink data being performed during the previous active time for the user equipment.

10. The network node of claim 1, wherein said indication comprises a configuration by radio resource control (RRC) signaling.

11. The network node of claim 1, wherein said indication comprises one or more information elements (IE) indicating a position of the downlink control information in a downlink control information format.

12. The network node of claim 1, wherein said indication comprises indicates whether or not to monitor for the wake-up signal.

13. A user equipment comprising:
    at least one processor; and
    at least one memory including computer program code, wherein the at least one memory and the computer program code are configured to, with the at least one processor, cause the user equipment at least to:
    receive, from a network node, signaling comprising information associated with at least one period of time that the user equipment is to monitor for a wake-up signal to decode, wherein the information comprises an indication for the user equipment to dynamically control monitoring for the wake-up signal for the decoding, wherein the indication indicates whether or not to monitor the wake-up signal for the at least one period of time before a next on-duration start assigned to the user equipment, and wherein the indication only concerns the next on-duration; and
    configure the user equipment, based on the information, to perform the monitoring for the wake-up signal to decode during the at least one period of time.

14. The user equipment of claim 13, wherein the indication is provided via a medium access control element, a downlink control information, or a most recent wake-up signal.

15. The user equipment of claim 13, wherein the indication comprises an indication to monitor for the wake-up signal only during one of a short discontinuous reception cycle or a long discontinuous reception cycle.

16. The user equipment of claim 15, wherein the indication comprises an indication to monitor the wake-up signal for the at least one period of time only when the long discontinuous reception cycle is being used.

17. The apparatus user equipment of claim 15, wherein the indication comprises an indication that, when the short discontinuous reception cycle is being used, to monitor the next on-duration start for the wake-up signal without monitoring for the wake-up signal in advance of the next on-duration start.

18. The user equipment of claim 13, wherein the indication comprises an indication to monitor for the wake-up signal for the at least one period of time before a start of the next on-duration if no communication of uplink data or downlink data was performed during a previous active time for the user equipment.

19. The user equipment of claim 18, wherein, in an instance in which there was no communication of uplink data or downlink data performed during the previous active time, the indication comprises an indication to monitor the on-duration without monitoring the wake-up signal in advance.

20. The user equipment of claim 18, wherein, in an instance in which communication of uplink data or downlink data was performed during the previous active time, the indication comprises an indication to monitor for the wake-up signal in advance.

21. The user equipment of claim 20, wherein the indication to monitor for the wake-up signal in advance is based on an acknowledgement being received by the user equipment in response to communication of uplink data being performed during the previous active time for the user equipment.

22. The user equipment of claim 13, wherein said indication comprises a configuration by radio resource control (RRC) signaling.

23. The user equipment of claim 13, wherein said indication comprises one or more information elements (IEs) indicating a position of the downlink control information in a downlink control information format.

24. The user equipment of claim 13, wherein said indications indicates whether or not to monitor for the wake-up signal.

25. A method comprising:
determining information associated with at least one period of time that a user equipment is to monitor for a wake-up signal to decode, wherein the information comprises an indication for the user equipment to dynamically control monitoring for the wake-up signal to decode, wherein the indication indicates whether or not to monitor the wake-up signal for the at least one period of time before a next on-duration start assigned to the user equipment, and wherein the indication only concerns the next on-duration; and
transmitting, using the network node, towards the user equipment, signaling comprising the information associated with the at least one period of time for monitoring for the wake-up signal to decode.

26. A method comprising:
receiving, from a network node, signaling comprising information associated with at least one period of time that the user equipment is to monitor for a wake-up signal to decode, wherein the information comprises an indication for the user equipment to dynamically control monitoring for the wake-up signal for the decoding, wherein the indication indicates whether or not to monitor the wake-up signal for the at least one period of time before a next on-duration start assigned to the user equipment, and wherein the indication only concerns the next on-duration; and
configuring the user equipment, based on the information, to perform the monitoring for the wake-up signal to decode during the at least one period of time.

* * * * *

UNITED STATES PATENT AND TRADEMARK OFFICE
CERTIFICATE OF CORRECTION

PATENT NO. : 12,015,981 B2
APPLICATION NO. : 16/847848
DATED : June 18, 2024
INVENTOR(S) : Samuli Turtinen et al.

It is certified that error appears in the above-identified patent and that said Letters Patent is hereby corrected as shown below:

In the Claims

In Column 20, Line 33, Claim 11, delete "(IE)" and insert -- (IEs) --, therefor.

In Column 21, Line 5, Claim 17, delete "apparatus user" and insert -- user --, therefor.

Signed and Sealed this
Twenty-fifth Day of March, 2025

Coke Morgan Stewart
*Acting Director of the United States Patent and Trademark Office*